Oct. 21, 1952 — K. I. STRINDEN — 2,614,654
AUTOMOTIVE AIR VENT FILTER ATTACHMENT
Filed March 7, 1951 — 2 SHEETS—SHEET 1

Keith I. Strinden
INVENTOR.

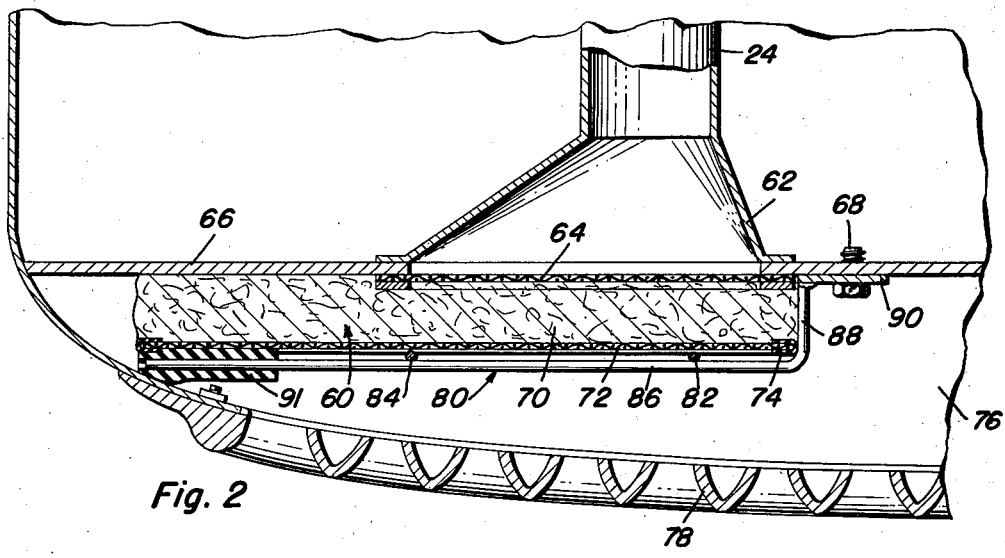
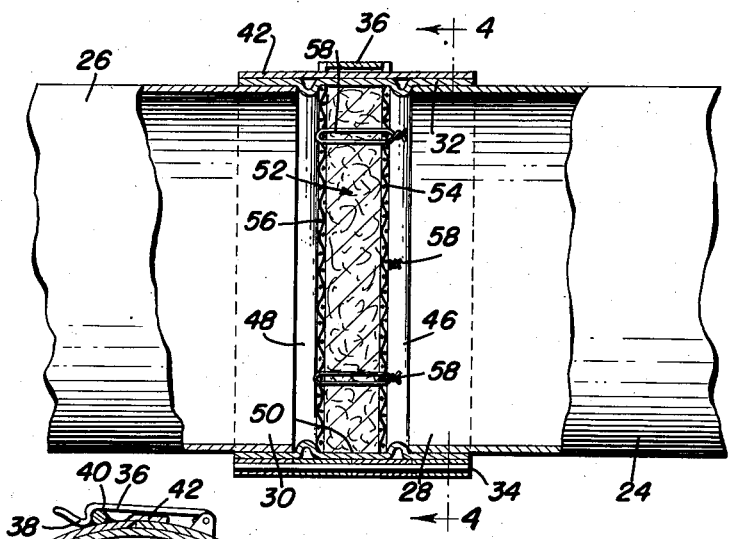
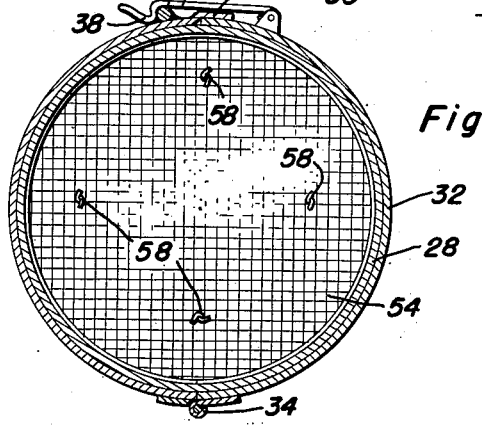

Patented Oct. 21, 1952

2,614,654

UNITED STATES PATENT OFFICE 2,614,654

AUTOMOTIVE AIR VENT FILTER ATTACHMENT

Keith I. Strinden, Litchville, N. Dak.

Application March 7, 1951, Serial No. 214,305

2 Claims. (Cl. 183—44)

This invention relates to improvements in the air intake assembly for a vehicle body.

An object of this invention is to provide means of filtering the air which is taken from the exterior of the body of a vehicle in the standard air intake assembly, the improvements residing in the specific location of the air filters and the means of mounting the air filters at said specific locations.

Ancillary objects and features of importance will become apparent in following the description of the illustrated form of the invention.

In the drawings:

Figure 2 is an enlarged sectional view taken substantially on the line 2—2 of Figure 1 and in the direction of the arrows;

Figure 3 is an enlarged sectional view taken on the line 3—3 of Figure 1 and in the direction of the arrows, and;

Figure 4 is a sectional view taken substantially on the line 4—4 of Figure 3 and in the direction of the arrows.

Figure 1:
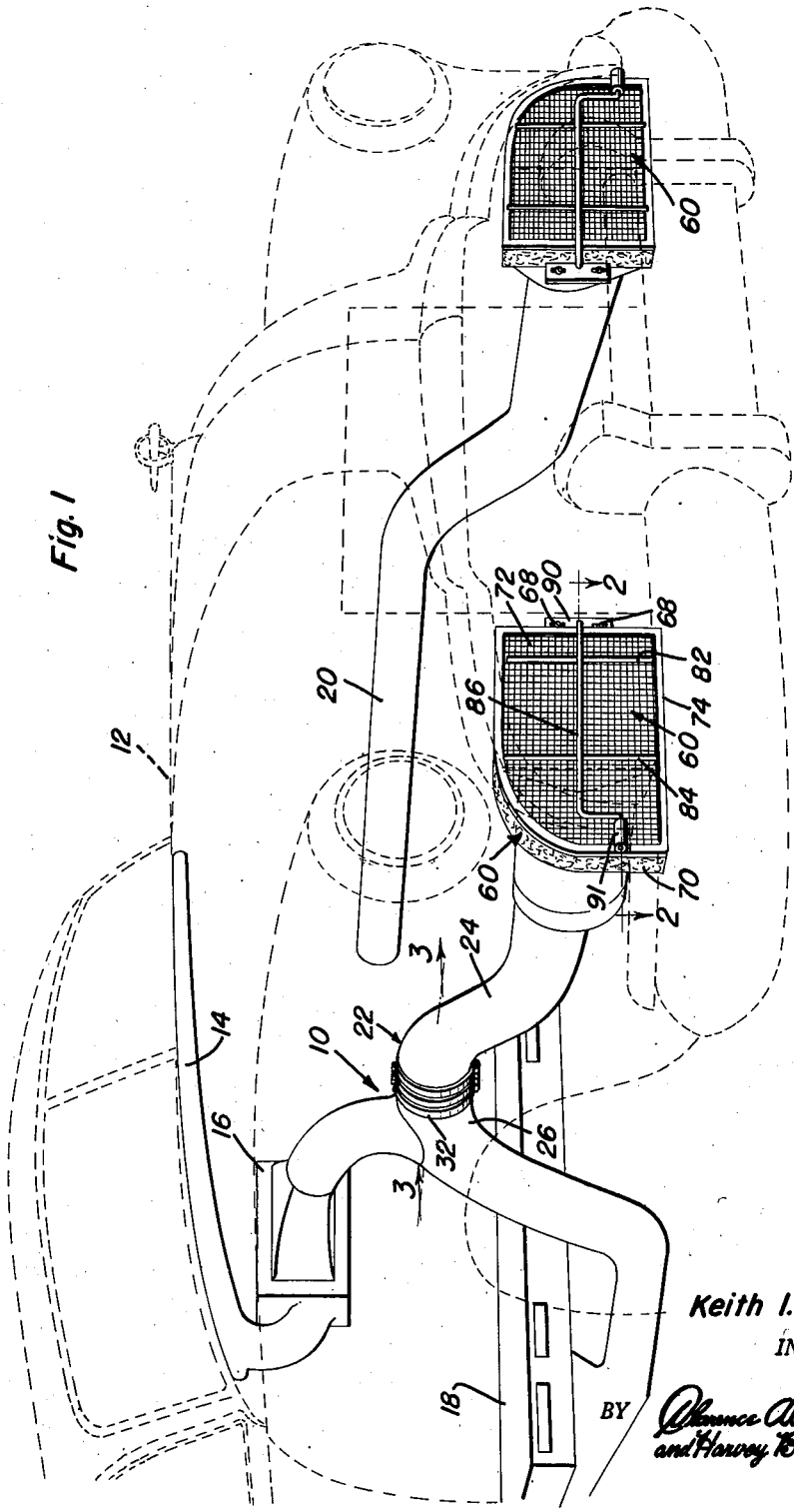
Figure 1 is a perspective view of a standard air intake assembly showing the location thereof in a vehicle which is partially illustrated and which is shown in phantom.

As illustrated in Figure 1 the standard air intake assembly 10 of the vehicle 12 includes various components among which are the defroster 14, heater unit 16, heated air manifold 18, air ducts 20 and 22, the air duct 22 in this instance being provided with two sections 24 and 26. The air intake assembly shown in Figure 1 is purely conventional and shows that the improved features are adapted to be located in a standard air intake assembly for a vehicle.

The sections 24 and 26 of the air duct 22 have confronting ends 28 and 30 which are spaced from each other and which are adapted to be connected together by a band 32, this band being preferably formed of two semi-cylindrical sections connected together by a hinge 34 at one pair of ends and releasably held together by a latch 36 at the other pair of ends. This latch is a pivoted arm which is mounted on one of the sections of the band 32, resilient in nature, and provided with a keeper 38 at the end opposite from the pivoted end, the keeper being adapted to engage the stop 40 which is fixed to the other of the band sections. A cover plate 42 for the junction of the band sections is carried by one of the sections and adapted to overlie a part of the outer surface of the other section when the band is disposed on the confronting ends 28 and 30 of the duct sections 24 and 26. The band 32 is provided with inwardly extending circumferential ribs 46 and 48, these ribs being spaced from each other in order to constitute a pocket 50 accommodating the circular air filter 52. Inasmuch as the ribs 46 and 48 are disposed between the confronting end edges of the duct sections 24 and 26, the band is held fixed firmly in place and constitutes not only a means of supporting the filter 52 but also a means of joining the confronting ends 28 and 30 together.

The filter includes a layer of filtering material located between two circular screens 54 and 56, the screens being held together by means of wire ties 58. By having the construction as described, the air filter 52 may be easily removed for cleaning or replacement purposes.

Attention is now invited primarily to Figure 2 to show the construction and assembly of the second filter 60. There are two filters 60 one being provided at the outer end of the duct section 24 and the other being provided at the outer end of the duct 20 inasmuch as it is now standard to use two intake ducts in an air intake system or assembly for a vehicle.

As disclosed in Figure 2 the duct section 24 has an air scoop 62 at its outer end and this air scoop is normally provided with a filtering screen 64 held fastened to a front vehicle body component or panel 66 by means of screws. The added filter 60 may be held fastened in place in advance of the screen 64 by the same screws which hold the screen in place or additional screws 68 as found desirable. The preferable construction of the filter 60 is a layer 70 of filtering material arranged to abut the screen 64 and a part of the panel 66 on one surface thereof and contacted by a screen 72 on the opposite surface thereof, this screen being provided with a resilient bead 74 around its edges to serve as an anti-rattle device. The screen 72 and the layer of filtering material 70 are adapted to seat upon the ledge 76 at the bottom of the grille 78 of the vehicle to partially support it, other support being derived from the bracket 80.

The bracket 80 includes two or more vertical wire pieces 82 and 84 which are spot-welded or otherwise rigidly fastened to a crank-shaped wire piece 86 which extends transversely across the screen 72. An angular end portion 88 constitutes a part of the crank-shaped member 86 and has a mounting plate 90 fixed to it by standard means, this mounting plate being provided with apertures to accommodate the screws 68 or the standard screws which are employed to hold the filtering screen 68 in place in alignment with the air scoop 62. The opposite end of the crank-shaped member 86 has a rubber or other equivalent material bumper 91 thereon to contact firmly the inner surface of a part of the grille 78 or the mounting for the grille so that the bracket is held firmly in place and yet, due to the presence of the rubber bumper 91, the bracket will not rattle.

In use filters 60 are attached as described previously in alignment with the air scoops of the ducts 20 and 22. An additional filter 52 is supplied between the duct sections 24 and 26 so that various impurities from the air which is taken into the body of the vehicle may be removed. By using filters as described, it is not a difficult or time consuming operation to remove them for replacement or cleaning purposes.

Having described the invention, what is claimed as new is:

1. In a vehicle having a body and grille with a body air intake assembly which includes an air duct provided with an air scoop and a frontal screen for the air scoop, an air filter located exteriorly of said air scoop and having a rear surface confronting said screen, and means for holding said air filter against said screen including a bracket provided with mounting means to fasten to a part of the body of the vehicle and contact the front surface of said filter, said bracket carried by a part of the vehicle body behind the grille and contacting the front surface of the filter, and a resilient bumper spacing the bracket from the grille by contacting the grille.

2. In a vehicle having a body and grille with a body air intake assembly which includes an air duct provided with an air scoop and a frontal screen for the air scoop, an air filter located exteriorly of said air scoop and having a rear surface confronting said screen, and means for holding said air filter against said screen including a bracket provided with mounting means to fasten to a part of the body of the vehicle and contact the front surface of said filter, said bracket carried by a part of the vehicle body behind the grille and contacting the front surface of the filter, and a resilient bumper spacing the bracket from the grille by contacting the grille, the vehicle including a ledge below and in advance of the air scoop, said filter resting on said ledge.

KEITH I. STRINDEN.

REFERENCES CITED

The following references are of record in the file of this patent:

UNITED STATES PATENTS

| Number | Name | Date |
|---|---|---|
| 2,161,728 | Stout | June 6, 1939 |
| 2,171,797 | Kennedy | Sept. 5, 1939 |
| 2,277,552 | Kneedler | Mar. 24, 1942 |
| 2,342,872 | Le Feure et al. | Feb. 29, 1944 |
| 2,445,392 | Findley | July 20, 1948 |
| 2,551,932 | Berge | May 8, 1951 |

FOREIGN PATENTS

| Number | Country | Date |
|---|---|---|
| 670,408 | Germany | Jan. 18, 1939 |